United States Patent [19]

Ukita

[11] Patent Number: 4,788,264

[45] Date of Patent: Nov. 29, 1988

[54] METHOD OF PREPARING MODIFIED POLYETHYLENES

[75] Inventor: Mamoru Ukita, Ichihara, Japan

[73] Assignee: Idemitsu Petrochemical Co., Ltd., Tokyo, Japan

[21] Appl. No.: 147,277

[22] Filed: Jan. 22, 1988

[51] Int. Cl.$^4$ .......................................... C08F 255/02
[52] U.S. Cl. .................... 525/285; 525/301; 525/74; 525/78; 525/265; 525/263
[58] Field of Search ................ 525/285, 301, 265, 263

[56] References Cited

U.S. PATENT DOCUMENTS

| | | | |
|---|---|---|---|
| 3,658,948 | 4/1972 | McConnell | 525/285 |
| 3,849,516 | 11/1974 | Plank | 260/876 R |
| 3,868,433 | 2/1975 | Bartz et al. | 525/74 |
| 3,882,194 | 5/1975 | Krebaum et al. | 260/878 R |
| 3,886,227 | 5/1975 | Van Brederode et al. | 525/74 |
| 3,953,655 | 4/1976 | Steinkamp et al. | 525/285 |
| 4,087,587 | 5/1978 | Shida et al. | 525/279 |
| 4,087,588 | 5/1978 | Shida et al. | 525/279 |
| 4,230,830 | 10/1980 | Tanny et al. | 525/74 |
| 4,506,056 | 3/1985 | Gaylord | 525/285 |

Primary Examiner—Carman J. Seccuro
Attorney, Agent, or Firm—Antonelli, Terry & Wands

[57] ABSTRACT

A method of preparing a modified polyethylene which comprises melt kneading 100 parts by weight of (A) a high density polyethylene having a branching degree of not more than 5 per 1,000 carbon atoms of principal chain, from 0.2 to 3 parts by weight of (B) an unsaturated carboxylic acid or a derivative thereof, and from 0.01 to 0.5 part by weight of (C) an organic peroxide, the weight ratio of (C) to (B), (C)/(B), being from 0.01 to 0.5.

The modified polyethylenes obtained by the use of the method of the present invention not only have excellent heat resistance, moldability, and so forth, but also are extremely improved in their adhesion property, especially in the property of adhering to a saponified ethylene-vinyl acetate copolymer, a polyamide resin, and a polyester resin, and therefore the modified polyethylenes can be advantageously used with these materials for the production of laminated boards.

16 Claims, No Drawings

METHOD OF PREPARING MODIFIED POLYETHYLENES

BACKGROUND OF THE INVENTION (1) Industrial Field of the Invention

The present invention relates to a method of preparing modified polyethylenes. More specifically, the present invention relates to a method of preparing modified polyethylenes having excellent adhesion property, heat resistance, moldability, etc.

(2) Description of the Related Art

Polyolefin resins have been widely used because of their excellent mechanical strength, moldability, and chemical stability. They however have a problem in poor adhesion property.

Although there has been known a method for improving the adhesion property of polyolefin resins of adding an unsaturated carboxylic acid and an organic peroxide to a polyolefin resin and melt kneading the resuting mixture, the method is insufficient in improving the adhesion property.

As other attempts, there have been proposed methods of adding a rubber material further (cf., Japanese Patent Publication Nos. 40112/1979 and 5766/1980). However, the addition of a rubber material caused a new problem that the heat resistance and moldability are decreased.

SUMMARY OF THE INVENTION

The object of the invention is to provide a method of preparing modified polyethylenes having an improved adhesion property without decreasing heat resistance and moldability.

As the result of our diligent studies it has been found that the above object are attained by melt kneading a polyethylene having a specified structure with an unsaturated carboxylic acid or a derivative thereof and an organic peroxide in a specified ratio, and the knowledge led us to complete the present invention.

The present invention provides a method of preparing a modified polyethylene which comprises melt kneading 100 parts by weight of (A) a high density polyethylene having a branching degree of not more than 5 per 1,000 carbon atoms of principal chain, from 0.2 to 3 parts by weight of (B) an unsaturated carboxylic acid or a derivative thereof, and from 0.01 to 0.5 part by weight of (C) an organic peroxide, the weight ratio of (C) to (B), (C)/(B), being from 0.01 to 0.5.

DESCRIPTION OF THE PREFERRED EMBODIMENTS

The (A) high density polyethylene (HDPE) which may be used in the present invention has a branching degree not more than 5, preferably from 0 to 3, per 1,000 carbon atoms of principal chain. The preferred are those having a density of from 0.960 to 0.980 g/cm$^3$, preferably from 0.963 to 0.980 g/cm$^3$, more preferably from 0.965 to 0.980 g/cm$^3$. Such high density polyethylenes may be prepared by the use of known polymerization methods wherein Ziegler catalysts are employed.

The branching degree so-called in this specification means the number of branches per 1,000 carbon atoms of principal chain, and the branching degree was determined by analyzing a polyethylene by $^{13}$C-NMR and then measuring the number of branches such as methyl branch, etc. per 1,000 carbon atoms of principal chain.

If a high density polyethylene having a larger branching degree, a low density polyethylene, a linear low density polyethylene, or the like is used in place of the above-mentioned high density polyethylene, cross-linking at the time of kneading proceeds excessively resulting in an insufficient adhesion property.

Some illustrative examples of the (B) unsaturated carboxylic acids which may be suitably used in the present invention include maleic acid, maleic anhydride, fumaric acid, citraconic acid, crotonic acid, isocrotonic acid, mesaconic acid, itaconic acid, angelic acid, sorbic acid, acrylic acid, itaconic anhydride, and citraconic anhydride, and maleic anhydride is particularly desirable among the others. Some illustrative examples of the derivatives of the unsaturated carboxylic acids which may be suitably used in the present invention include metal salts, amides, imides, and esters of the above-described unsaturated carboxylic acids. In the method of the present invention, the above-described unsaturated carboxylic acids and the derivatives thereof may be used individually or in a combination of two or more of them.

The (C) organic peroxides which may be suitably used in the present invention are those having a decomposition temperature of preferably from 80° to 140° C., more preferably from 90° to 130° C., and some illustrative examples of such organic peroxides include dicumyl peroxide, tert-butyl cumyl peroxide, 1,3-bis(tert-butylperoxyisopropyl)benzene, di-tert-butyl peroxide, 2,5-dimethyl-2,5-di(tert-butylperoxy)hexane, 2,5-dimethyl-2,5-di(tert-butylperoxy)hexyne-3, and tert-butyl peroxybenzoate.

The amounts of (B) and (C) to be added will be described as follows. The amount of (B) to be added is from 0.2 to 3 parts by weight, preferably from 0.5 to 2 parts by weight, per 100 parts by weight of the high density polyethylene. An amount less than 0.2 part by weight results in unsatisfactory adhesion property owing to scarcity of polar groups, and an amount more than 3 parts by weight results in an advance of gelation and yellowing. The amount of (C) to be added is from 0.01 to 0.5 part by weight, preferably from 0.03 to 0.2 part by weight, per 100 parts by weight of the high density polyethylene. If the amount is less than 0.01 part by weight, the adhesion property will not be improved, and if the amount is more than 0.5 part by weight, gelation will proceed resulting in a decrease in the adhesion property. The ratio of (C)/(B) is from 0.01 to 0.5 in weight ratio, preferably from 0.02 to 0.2. A ratio less than 0.01 results in an increased amount of unreacted monomers, and a ratio of more than 0.5 results in a decrease in the adhesion property owing to an advance of gelation.

According to the present invention, the objective modified polyethylenes are prepared by melt kneading a mixture of the above-described (A), (B), and (C), preferably at a temperature of from 190° to 270° C., more preferably from 200° to 250° C., preferably for from 1 to 10 minutes. If the temperature at the time of melt kneading is less than 190° C., the progress of reaction becomes difficult, and a temperature more than 270° C. aggravates gelation.

At the time of melt kneading or after melt kneading, other thermoplastic resins, rubbers such as ethylene-propylene rubbers, ethylene-propylene terpolymers, etc., tackifier resins such as rosin base resins, polyterpene base resins, etc., waxes, and other additives such as various kinds of fillers, antioxidants, UV absorbers, anti-static agents, dispersing agents, etc. may also be optionally added at need, so long as the additives do not ruin the effects of the present invention.

Thus obtained modified polyethylenes can be easily adhered in a sufficient strength to other materials, for example metal materials such as aluminum, iron, galvanized sheet iron, copper, etc., thermoplastic resins such as polyolefins, polyesters, polystyrene base resins, saponified ethylene-vinyl acetate copolymers, polyamide resins, polycarbonate resins, etc., thermosetting resins such as epoxy resins, polyurethane resins, etc., cellulose base materials such as papers, clothes, woods, etc., glass, and the like, and they therefore can be suitably employed for production of various kinds of laminated boards.

For example, when the modified polyethylenes prepared by the method of the present invention are laminated with a saponified ethylene-vinyl acetate copolymer, a polyamide resin, or the like, it is usually desirable to use the modified polyethylenes in a form of a composition consisting of from 1 to 70% by weight, preferably from 2 to 50% by weight of a modified polyethylene of the present invention and from 99 to 30% by weight, preferably from 98 to 50% by weight of a low density polyethylene and a linear low density polyethylene.

Production of laminated boards by the use of the modified polyethylenes prepared by the method of the present invention may be conducted by the use of a technique selected from extrusion laminating techniques, thermo-pressing techniques, melt coating techniques, powder coating techniques, and so forth, in consideration of the kinds, shapes, etc. of materials to be laminated with the modified polyethylenes.

The following examples are presented to describe the present invention in more detail, and the present invention is by no means limited by these examples.

EXAMPLES 1 TO 11 AND COMPARATIVE conditions shown in the Table 1 to obtain a modified polyethylene.

The branching degree was determined by analyzing the polyethylene by $^{13}$C-NMR and measuring the number of branches per 1,000 carbon atoms of principal chain.

(2) Valuation of Adhesion Property

Pellets of a resin composition were prepared by dry blending 30 parts by weight of the modified polyethylene obtained in the above (1) and 70 parts by weight of a low density polyethylene (density: 0.924 g/cm$^3$, MI: 3 g/10 min) and then melt kneading thus obtained mixture.

Thus obtained resin composition was extruded from an extruder A, and a saponified ethylene-vinyl acetate copolymer (EVOH) or nylon 6 was extruded from an extruder B, and they are formed into a two-layered sheet of 200μ/200μ in thickness by the use of a two-layered T dye. From the two-layered sheet was cut out a test piece of 25 mm in width, and the interlaminar strength of the test piece was measured by the use of a tensile tester (by Shimadzu Co., Autograph Model DCS 2000, testing speed 50 mm/min). The results are shown in the Table 1.

EXAMPLE 12

The procedure of Example 7 was repeated with the exception that a high density polyethylene (b) having a branching degree of 2.5, a density of 0.965 g/cm$^3$, and MI of 13 g/10 min was used in place of the high density polyethylene used in Example 7.

COMPARATIVE EXAMPLE 7

The procedure of Example 7 was repeated with the exception that a high density polyethylene (c) having a branching degree of 6.3, a density of 0.956 g/cm$^3$, and MI of 10 g/10 min was used in place of the high density polyethylene used in Example 7.

TABLE 1

| | (A) HDPE | | (B) Maleic anhydride | (C) Organic peroxide | | Melt kneading | Modified polyethylene Content of maleic an- | | Adhesion strength | |
| | Type | Wt. part | Wt. part | Wt. part | (C)/(B) | Temp. (°C.) | hydride (Wt %) | MI (g/10 min) | EVA (kg/25 min) | Nylon 6 (kg/25 mm) |
|---|---|---|---|---|---|---|---|---|---|---|
| Ex. 1 | a | 100 | 0.2 | 0.03 | 0.15 | 230 | 0.2 | 3.5 | 3.7 | 4.8 |
| Ex. 2 | a | 100 | 0.5 | 0.05 | 0.10 | 230 | 0.5 | 0.7 | 6.0< | 6.0< |
| Ex. 3 | a | 100 | 2.0 | 0.05 | 0.025 | 230 | 1.5 | 0.3 | 5.4 | 6.0< |
| Ex. 4 | a | 100 | 3.0 | 0.5 | 0.17 | 230 | 2.6 | 0.07 | 3.8 | 4.8 |
| Ex. 5 | a | 100 | 0.5 | 0.01 | 0.02 | 230 | 0.4 | 3.2 | 3.2 | 4.0 |
| Ex. 6 | a | 100 | 1.0 | 0.03 | 0.03 | 230 | 0.8 | 1.0 | 6.0< | 6.0< |
| Ex. 7 | a | 100 | 1.0 | 0.1 | 0.1 | 230 | 0.9 | 0.5 | 6.0< | 6.0< |
| Ex. 8 | a | 100 | 1.0 | 0.2 | 0.2 | 230 | 1.0 | 0.1 | 4.7 | 6.0< |
| Ex. 9 | a | 100 | 1.0 | 0.1 | 0.1 | 200 | 0.8 | 1.1 | 4.1 | 5.5 |
| Ex. 10 | a | 100 | 1.0 | 0.1 | 0.1 | 250 | 1.0 | 0.3 | 6.0< | 6.0< |
| Ex. 11 | a | 100 | 1.0 | 0.1 | 0.1 | 270 | 1.0 | 0.1 | 4.1 | 6.0< |
| Ex. 12 | b | 100 | 1.0 | 0.1 | 0.1 | 230 | 0.9 | 1.5 | 4.7 | 6.0< |
| Comp. Ex. 1 | a | 100 | 0.1 | 0.02 | 0.2 | 230 | 0.1 | 3.8 | 0.9 | 1.2 |
| Comp. Ex. 2 | a | 100 | 4.0 | 0.4 | 0.1 | 230 | 2.6 | 0.01 | 0.6 | 1.0 |
| Comp. Ex. 3 | a | 100 | 0.2 | 0.005 | 0.025 | 230 | 0.1 | 4.1 | 0.7 | 1.0 |
| Comp. Ex. 4 | a | 100 | 3.0 | 0.6 | 0.2 | 230 | 2.6 | 0.01 | 1.3 | 1.9 |
| Comp. Ex. 5 | a | 100 | 2.0 | 0.01 | 0.005 | 230 | 0.7 | 2.3 | 1.0 | 1.3 |
| Comp. Ex. 6 | a | 100 | 0.5 | 0.3 | 0.6 | 230 | 0.5 | 0.1 | 0.3 | 0.4 |
| Comp. Ex. 7 | c | 100 | 1.0 | 0.1 | 0.1 | 230 | 0.9 | 1.2 | 1.0 | 1.6 |

EXAMPLES 1 TO 6

(1) Preparation of a Modified Polyethylene

A high density polyethylene (a) having a branching degree of 0.2, a density of 0.968 g/cm$^3$, and MI (melt index) of 5 g/10 min, maleic anhydride, and 1,3-bis(tert-butylperoxyisopropyl)benzene (organic peroxide) were dry blended and then melt kneaded in a ratio and under

What is claimed is:

1. A method of preparing a modified polyethylene which comprises melt kneading 100 parts by weight of (A) a high density polyethylene having a branching degree of not more than 5 per 1,000 carbon atoms of principal chain, from 0.2 to 3 parts by weight of (B) an unsaturated carboxylic acid or a derivative thereof, and from 0.01 to 0.5 part by weight of (C) an organic peroxide, the weight ratio of (C) to (B), (C)/(B), being from 0.01 to 0.5.

2. The method as claimed in claim 1, wherein said (A) high density polyethylene has a branching degree of from 0 to 3 per 1,000 carbon atoms of principal chain.

3. The method as claimed in claim 1, wherein said (A) high density polyethylene has a density of from 0.960 to 0.980 g/cm$^3$.

4. The method as claimed in claim 3, wherein said (A) high density polyethylene has a density of from 0.965 to 0.980 g/cm$^3$.

5. The method as claimed in claim 1, wherein said (B) unsaturated carboxylic acid is maleic anhydride.

6. The method as claimed in claim 1, wherein said (C) organic peroxide has a decomposition temperature of from 80° to 140° C.

7. The method as claimed in claim 6, wherein said (C) organic peroxide is 1,3-bis(tert-butylperoxyisopropyl)-benzene.

8. The method as claimed in claim 1, wherein melt kneading is carried out at a temperature of from 190° to 270° C.

9. A modified polyethylene prepared by the method of claim 1.

10. A modified polyethylene prepared by the method of claim 2.

11. A modified polyethylene prepared by the method of claim 3.

12. A modified polyethylene prepared by the method of claim 4.

13. A modified polyethylene prepared by the method of claim 5.

14. A modified polyethylene prepared by the method of claim 6.

15. A modified polyethylene prepared by the method of claim 7.

16. A modified polyethylene prepared by the method of claim 8.

* * * * *